March 9, 1926. 1,576,025
L. B. BAUMHOVER
LOG SAWING MACHINE
Filed April 24, 1924 3 Sheets-Sheet 1
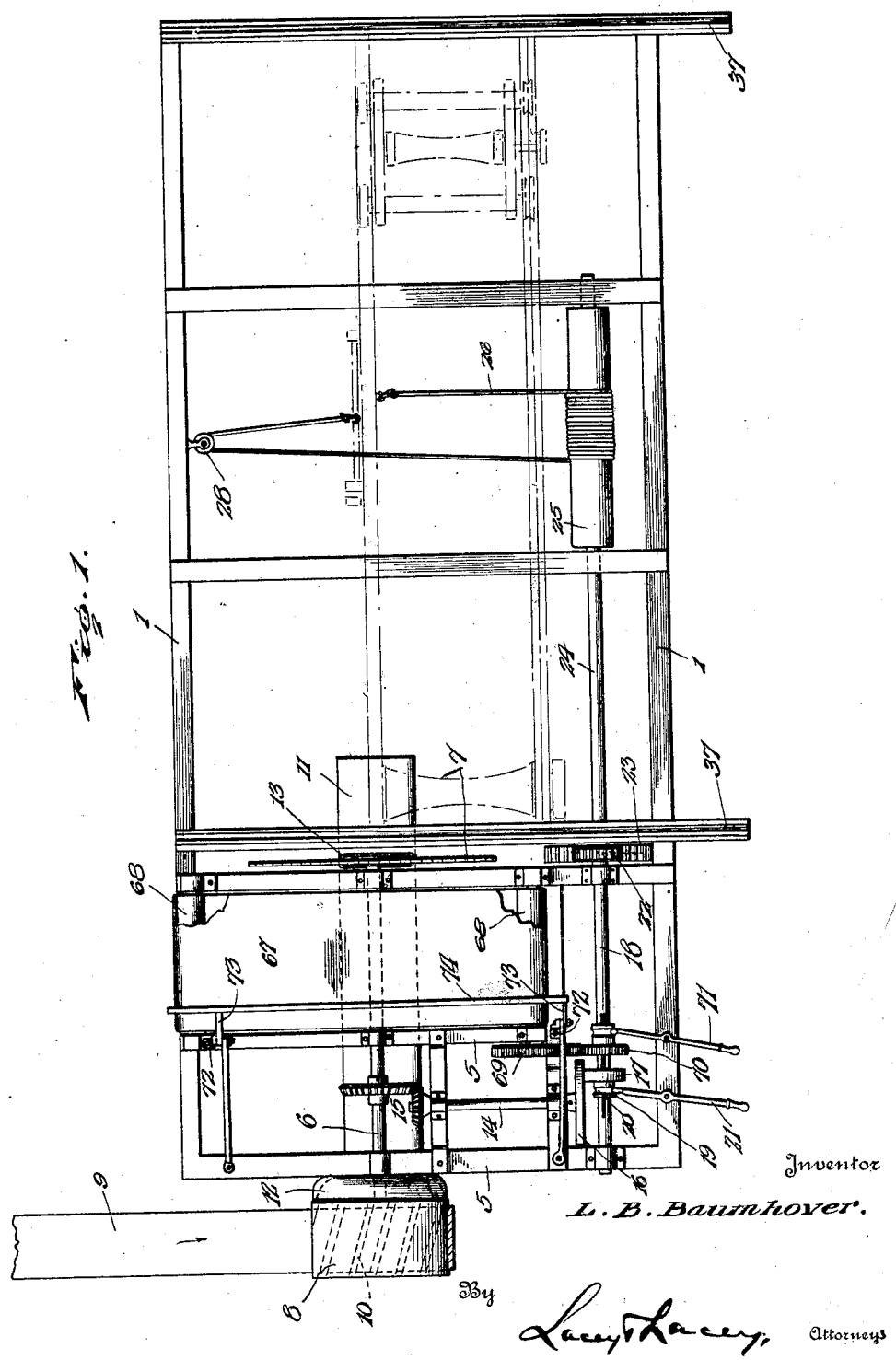
Inventor
L. B. Baumhover.
By Lacey & Lacey, Attorneys

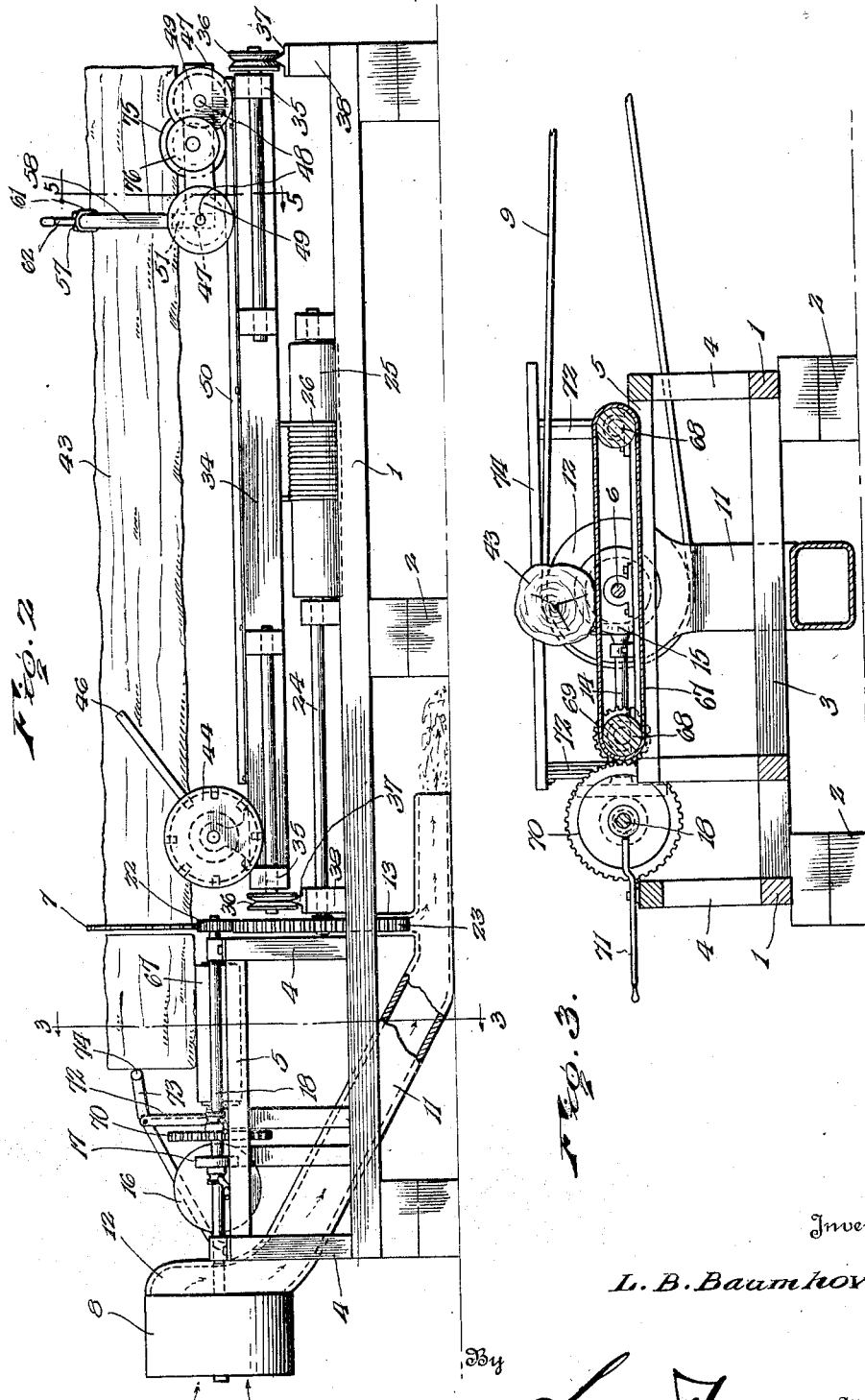

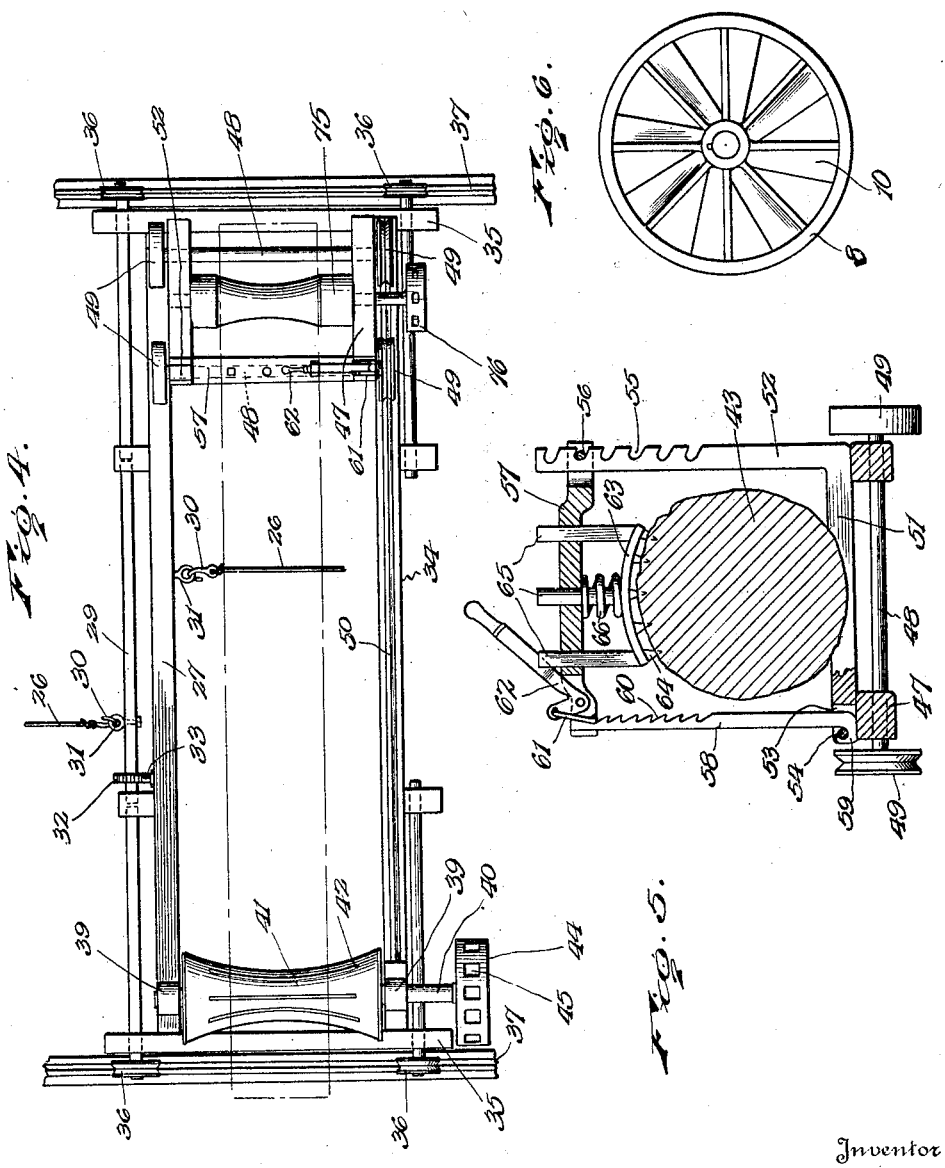

Patented Mar. 9, 1926.

1,576,025

UNITED STATES PATENT OFFICE.

LOUIS B. BAUMHOVER, OF CARROLL, IOWA.

LOG-SAWING MACHINE.

Application filed April 24, 1924. Serial No. 708,730.

*To all whom it may concern:*

Be it known that I, LOUIS B. BAUM-HOVER, a citizen of the United States, residing at Carroll, in the county of Carroll and State of Iowa, have invented certain new and useful Improvements in Log-Sawing Machines, of which the following is a specification.

This invention relates to machinery for sawing logs and has for its object the provision of novel means for feeding the log to the saw; novel means for guiding the log past the saw; novel means for carrying the severed portion of the log from the saw, and novel means for preventing the sawdust accumulating so as to clog the action of the saw. The invention also seeks to provide novel means for effectually supporting the log while it is being cut and while it is being fed across the plane of the saw in position to permit a second cut. The invention also seeks to improve generally the construction, arrangement and operation of sawing machinery to the end that the efficiency and the durability of the same may be increased. These stated objects, and other objects which will incidentally appear in the course of the following description, are attained in such a mechanism as is illustrated in the accompanying drawings, and the invention resides in certain novel features which will be particularly pointed out in the appended claims.

In the drawings:

Figure 1 is a plan view of my improved apparatus, the carriage being indicated by dotted lines;

Fig. 2 is a front elevation of the apparatus;

Fig. 3 is a transverse section on the line 3—3 of Fig. 2;

Fig. 4 is a detail plan view of the carriage;

Fig. 5 is a detail transverse section on the line 5—5 of Fig. 2 showing the work-securing means, and Fig. 6 is a detail view of the combined driving pulley and fan.

In carrying out my invention, I employ a main frame consisting of beams or sills 1 which are supported upon any suitable anchors or foundation members 2 which will rigidly maintain the sills in a level position. The sills are connected at their ends and at suitable intermediate points by cross bars 3, and at one end of the frame I provide standards or posts 4 carrying at their upper ends braces and connecting bars, indicated at 5, whereby to support the saw and the mechanism immediately adjacent the same.

The main driving shaft or saw arbor 6 is journaled in suitable bearings supported by the upper bars or beams 5 and the saw 7 is secured to the inner end of the said shaft. Upon the outer end of the main shaft or saw arbor is secured a band pulley 8, around which a belt 9 is trained to impart power to the pulley from any convenient prime motor or source of motion. The spokes 10 of the said driving pulley are in the form of webs extending radially between the saw arbor and the rim of the pulley but having their width disposed at an oblique angle to the axis of the pulley or the saw arbor, as will be readily understood upon reference to Figs. 1 and 6. It will also be noted upon reference to said figures that the spokes have an appreciable width so that, when the pulley is rotating, the spokes will act as fan blades to create an air blast which is caused to travel inwardly and below the saw and create a suction thereon whereby the sawdust will be carried away from the saw and prevented from accumulating so as to choke the action of the same. To control the said blast, I provide a conduit 11 which has one end expanded so as to provide a circular hood 12 fitting closely to the inner side of the combined pulley and fan and thereby receive and confine the air blast so that it will be forced to travel through the conduit which extends downwardly from the pulley and below the main frame of the machine, as shown clearly in Fig. 2. On the upper side of the conduit in the plane of the saw is provided a nozzle 13 which extends up to the saw and may fit about the lower portion of the same so that the suction through the conduit will draw the sawdust through the nozzle into the conduit as rapidly as it is formed and the saw will be maintained clear and free of all accumulations. The sawdust may be allowed to accumulate below the main frame or the conduit may be extended to any desired point.

A transmission shaft 14 is journaled upon the frame and is operatively connected at its rear end with the driving shaft or saw arbor 6 by gearing 15 which may be cog gearing, as shown, or may be frictional gearing, if preferred. This transmission shaft 14 extends forwardly upon the frame and is equipped at its front end with a friction driving disk 16 to impart motion to a smaller friction disk 17 slidably mounted upon a countershaft 18 but constrained to rotate with said shaft. The said disk 17 is provided with a hub or sleeve 19 having an annular groove 20 in its circumferential surface, which groove is engaged by a shifting lever 21 mounted upon the main frame, as shown clearly in Fig. 1. By properly adjusting the lever 21, the disk 17 may be shifted radially of the disk 16 and the speed of the countershaft thereby regulated. If the disk 17 be shifted across the center of the disk 16, the rotation of the countershaft will be reversed. Upon the inner end of the countershaft 18 is a pinion 22 meshing with a gear 23 arranged below it and secured upon the inner end of a drum shaft 24. This drum shaft is rotatably mounted in suitable bearings provided therefor upon the sills or beams 1 and about midway the gear 23 and the outer ends of the said sills a drum 25 is secured upon the said shaft. A cable 26 is wound tightly upon the drum 25 and one end of the said cable extends directly from the drum to the rear bar 27 of the carriage, while the opposite end portion of the cable is trained about a guide pulley 28 upon the rear bar of the main frame and then carried forwardly to be attached to a tightening bar 29 upon the rear side of the bar 27 of the carriage. As shown in Fig. 4, the cable is provided at its ends with hooks 30 engaging in eyes 31 secured in the bar 27 and in the tension or tightening bar or rod 29 respectively. The tension bar or rod 29 is rotatably mounted in suitable bearings upon the carriage frame bar 27, and a ratchet wheel 32 is secured upon the said tension bar or rod and engaged by a pawl 33 hung upon the frame bar 27. By rotating the tension rod 29, the cable 26 will be partly wound around the same and will be thereby put under increased tension so that stretching of the cable may be easily compensated and the proper engagement of the cable about the drum 25 maintained. The carriage comprises a front bar 34 connected with the bar 27 by end bars 35 and mounted upon the end bars 35 are rollers 36 which are adapted to travel upon tracks 37 secured to the upper edges of cross bars 38 which, in turn, are secured upon the sills 1. Preferably, the rollers 36 have grooved peripheries and the tracks 37 are in the form of upstanding rails adapted to fit closely within the grooved peripheries of the rollers so that the carriage will be held to a rectilinear path and will be fed from front to rear or vice versa upon the main frame as the cable 26 is wound upon the drum 25 in one or the other direction. The log is, of course, supported on the carriage and, as the carriage is fed rearwardly, the log will be fed to and past the saw which will cut into and through the log.

It will be noted that the pinion 22 and gear 23 will transmit motion to the drum shaft 24 so that the said shaft will rotate at a less speed than the saw arbor or the countershaft and, therefore, the log will be fed to the saw at a speed commensurate with the capability of the saw to cut through the log.

At the inner ends of the front and rear bars 34 and 27 of the carriage, I provide bearings 39 in which is journaled a shaft 40 which carries a roller 41 between the bearings, the said roller having its periphery dished or made concave from end to end and preferably provided with longitudinally extending ribs 42 whereby a log, indicated at 43, resting upon the said roller will be firmly supported but may be caused to travel in the direction of its own length but prevented from rolling toward either end of the roller. To feed the log over the roller, a circular head 44 is secured upon the front end of the shaft 40, and this head is provided in its periphery with sockets 45 in which a lever 46 may be engaged. The lever is removably fitted in any one socket and then actuated manually so as to turn the shaft 40 and the roller 41 secured thereon so that the log may be fed endwise after the completion of each cut to present a second portion of the log in position to be cut. The outer end of the log is carried by a trailer which is mounted upon the carriage to travel thereon. The base or truck of the trailer consists of a frame 47 which may be of any convenient form, furnishing bearings for axles 48 equipped with rollers 49 adapted to travel upon the bars 27 and 34. The bar 27 has a flat smooth upper surface and the rear rollers 49 are preferably constructed with smooth peripheries to travel upon the said bar. To prevent lateral movement of the trailer and hold it to a rectilinear path, the front rollers 49 are preferably constructed with grooved peripheries adapted to engage and be guided by a track 50 secured upon the bar 34. The trailer is, of course, provided with a saddle or cross bar 51 upon which the log may rest, as shown in Fig. 5, and a standard 52 rises from the rear end of the said cross bar, the front end of the cross bar being forked or otherwise constructed to provide a recess 53 across which is secured a locking pin or bolt 54. The standard 52 is provided with a plurality of notches 55 in its rear edge along its upper portion, and these notches are engaged by a pin or bolt 56 extending across one end of a clamping bar 57, the end of the said clamping bar being forked or slotted so that it may span the upper end of the standard 52 and the standard be received between the inner portion of the bar and the locking pin or bolt 56. At the front side of the trailer, I provide a locking bar 58 which is provided at its lower end with a hook 59 adapted to extend within the recess 53 and engage under and around the pin or bolt 54, as clearly shown in Fig. 5. The rear edge of this locking bar 58 is constructed with notches or hooks 60 with any one of which may be engaged a ring or loop 61 carried by the free end of an angle lever 62 which is fulcrumed within the free end of the clamping bar 57. Below the clamping bar 57 is a clamping head 63 which is of arcuate form to fit readily over the log and provided on its under side with spurs 64 adapted to engage the log and hold it firmly in place. Stems 65 rise from the head 63 and fit slidably through the bar 57, a spring 66 being coiled around the central stem between the bar 57 and the head 63 so that pressure may be exerted upon the head through the bar to firmly hold the log upon the trailer. It will be readily seen that the clamping bar may be slid downwardly upon the standard 52 so that the head 63 will be firmly held to logs of various sizes and after the head and the bar have been thus adjusted, the ring or loop 61 is engaged in a proper notch 60 of the locking bar 58, after which the lever 62 is swung downwardly and inwardly and the locking bar drawn into such close engagement with the pin 54 that accidental separation of the parts will be prevented. The trailer is equipped with a feed roller 75 which is similar to the roller 41 and is provided at its front end with a head 76, the upper portion of the circumferential surface of the roller being preferably slightly higher than the saddle 51. When cutting a very long log when the trailer was not provided with a feed roller, it was necessary to use a pry of some kind to support the log off the trailer while readjusting the trailer to the outer portion of the log. With the present construction, however, after the trailer has been drawn close to the feed roller 41, the clamping members 57 and 63 may be released and the roller 75 then rotated in contact with the log to effect travel of the trailer under the log until it reaches the proper point to be again clamped to the log.

Between the gearing 15 and the saw, I provide a conveyer 67 which is preferably an endless belt or apron trained around rollers 68 at the rear and adjacent the front of the main frame. The shaft or axle of the front roller 68 is extended outwardly and equipped with a pinion 69 meshing with a gear 70 slidably fitted upon the countershaft 18 but constrained to rotate therewith. This gear 70 may be shifted along the countershaft by a lever 71 in an obvious manner so that it may be thrown into or out of mesh with the pinion 69 and the conveyer apron 67 thereby actuated or permitted to remain at rest. Posts 72 are erected upon the frame adjacent the outer side edge of the conveyer and to the upper ends of these posts are pivoted arms 73 carrying a rail 74 which constitutes a guide and gage for the log. As shown clearly in Fig. 2, the end of the log will abut the rail 74 and pivotal movement of the arms 73 will set the said rail not only higher or lower but at different distances from the saw and, consequently, the rail may be easily set at such distance from the saw that the desired length of the log will be cut. The conveyer 67 is timed to travel at the same speed as the carriage and, therefore, the greater length of the log and the end thereof which is being cut will travel uniformly and binding or bending of the saw will be avoided. The conveyer will continue its travel after the cut has been completed and the severed portion of the log will be thereby carried to the rear of the main frame and deposited upon the ground or onto another conveyer which will carry it to a point of storage or use.

After a section has been cut from the log, the travel of the belt 67 may be momentarily arrested by shifting the gear 70 and the travel of the carriage reversed by properly shifting the gear 17 so that the carriage will be returned to the front of the apparatus to permit the log to be adjusted in position for another cut. After the log has been adjusted, the pulley 17 and the gear 70 may be returned to their operative positions and the previously cut section may then resume its travel to the rear of the machine. The manual rotation of the roller 41 will cause the log to be fed endwise over the carriage and the trailer will, of course, travel with the log so that the log will be firmly supported but may be very easily adjusted to feed successive portions of the same into position to be acted upon by the saw. The apparatus is compact and free of complicated arrangements so that it is not apt to get out of order and it will operate efficiently and easily.

Having thus described the invention, what is claimed as new is:

1. In a sawing apparatus, the combination of a main supporting frame, a saw mounted thereon, a trailer mounted for travel toward and from the plane of the saw, a standard rising from the rear side of the trailer, a clamping bar adjustably mounted upon the said standard, a clamping head carried by said bar and adapted to engage a log resting upon the trailer, means for locking said clamping bar to the trailer, and means for supporting the inner free end of the log and feeding the same across the plane of the saw.

2. In a sawing apparatus, the combination of a main supporting frame, a saw mounted thereon, a trailer mounted for travel toward and from the plane of the saw, a standard rising from the trailer at the rear thereof, a locking bar engaged with the front side of the trailer and rising therefrom, a clamping bar adjustably mounted upon the standard, a clamping head carried by said bar and adapted to engage a log resting upon the trailer, a locking lever fulcrumed upon the clamping bar adjacent the front end thereof, means carried by said lever to engage the locking bar whereby to lock the clamping bar to the log, and means for supporting the free end of the log and feeding the same across the plane of the saw.

3. In a sawing apparatus, the combination of a main frame, a saw mounted thereon, a trailer mounted for travel toward and from the plane of the saw, a standard rising from the rear side of the trailer, a clamping bar adjustably mounted upon the standard, a clamping head arranged below said bar and adapted to engage a log resting upon the trailer, stems rising from said clamping head through the clamping bar, an expansion spring disposed about one of said stems between the clamping head and the clamping bar, means for locking the clamping bar to the trailer, and means for supporting the inner free end of the log and feeding the same across the plane of the saw.

In testimony whereof I affix my signature.

LOUIS B. BAUMHOVER. [L. S.]